United States Patent
Nehmeyer

(10) Patent No.: US 8,590,413 B2
(45) Date of Patent: Nov. 26, 2013

(54) DAMPING DEVICE FOR A SELECTOR SHAFT AND GEARSHIFT TOWER HAVING THE DAMPING DEVICE

(75) Inventor: Thomas Nehmeyer, Nuremberg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 279 days.

(21) Appl. No.: 13/114,131

(22) Filed: May 24, 2011

(65) Prior Publication Data
US 2012/0297914 A1 Nov. 29, 2012

(51) Int. Cl.
*B60K 20/00* (2006.01)

(52) U.S. Cl.
USPC ............................................. 74/473.1; 74/335

(58) Field of Classification Search
USPC .................. 74/473.1, 484 R, 471 XY, 335
See application file for complete search history.

(56) References Cited

U.S. PATENT DOCUMENTS

| | | | | |
|---|---|---|---|---|
| 2,841,028 A * | 7/1958 | Adloff | ......................... | 74/484 R |
| 3,080,769 A * | 3/1963 | Wilson et al. | .............. | 74/473.31 |
| 3,693,467 A * | 9/1972 | Oehl | ........................... | 74/473.29 |
| 4,086,822 A * | 5/1978 | Kuroda | ...................... | 74/473.29 |
| 5,136,893 A * | 8/1992 | Wilhelmy | .................. | 74/473.29 |
| 5,259,263 A * | 11/1993 | Lyckberg | ..................... | 74/473.1 |
| 6,321,612 B1 * | 11/2001 | Leimbach et al. | .............. | 74/335 |
| 6,722,218 B1 * | 4/2004 | Fischer et al. | ................. | 74/335 |
| 2007/0034043 A1 * | 2/2007 | Feltrin | ......................... | 74/594.1 |

FOREIGN PATENT DOCUMENTS

| | | |
|---|---|---|
| DE | 103 242 24 A1 | 12/2004 |
| DE | 600 273 78 T2 | 12/2006 |
| FR | 2907871 A1 | 5/2008 |

\* cited by examiner

*Primary Examiner* — David M Fenstermacher
(74) *Attorney, Agent, or Firm* — Lucas & Mercanti, LLP

(57) ABSTRACT

A damping device for a selector shaft, having a damper weight with a damper unit, and having a guide device. The guide device guides the damper weight in a circumferential direction about the pivoting axis of the selector shaft. The damper weight is guided in the circumferential direction so that it is damped by the damper unit. The guide device also guides and/or holds the damper weight rigidly and/or without damping in the radial direction with respect to the pivoting axis. The damper unit is arranged off-center, asymmetrically and/or eccentrically with respect to the pivoting axis, and/or the damper weight and the damper unit form a damping absorber device arranged outside the force transmission path for the shifting and/or selection movement of the selector shaft.

16 Claims, 2 Drawing Sheets

DAMPING DEVICE FOR A SELECTOR SHAFT AND GEARSHIFT TOWER HAVING THE DAMPING DEVICE

FIELD OF THE INVENTION

The invention relates to a damping device for a selector shaft, having a damper weight, having a damper unit and having a guide device, wherein the guide device is designed to guide the damper weight in a circumferential direction about the selector shaft, wherein the damper weight is guided in the circumferential direction in such a way that it is damped by means of the damper unit, wherein the guide device is also designed to guide and/or hold the damper weight rigidly and/or without damping in the radial direction with respect to the pivoting axis. The invention also relates to a gearshift tower having this damping device.

BACKGROUND OF THE INVENTION

Selector shafts serve to transmit shifting movements and/or selection movements from a driver or an actuation system to a standard transmission, for example to a change speed gearbox. During the shifting or selection process, the selector shaft is moved or pivoted about its longitudinal axis. In order, in particular, to give a driver a comfortable shifting and/or selection sensation it is customary that an artificial shifting or selection force is imposed on the shifting or selection movements. It is therefore known, for example, to use additional shifting weights, which apply a certain inertia to the shifting or selection process. In addition to this desired shifting or selection force, the shifting weight can, also oscillate during the shifting process, which can lead to undesired vibrations. Various solutions are already known for compensating these undesired vibrations.

Document FR 29078781 relates to a lever device which is coupled to a selector shaft and which damps vibrations by means of a complex spring mass device.

Document DE 600 273 78 T2 forms a prior art which presents a system for damping a shifting movement, which system has a bridge structure which is coupled in a rotationally fixed fashion to the selector shaft. A damped shifting weight is arranged at each of the free ends of the bridge structure, with the result that during a shifting movement and resulting pivoting of the bridge structure about the pivoting axis of the selector shaft, the movements are damped in all directions.

Document DE 103 242 24 A1 relates to a damped shifting device for damping the shifting movement of a selector shaft, and it arguably forms the closest prior art. In this shifting device, two clutch halves are provided coaxially and concentrically with respect to the selector shaft, which clutch halves engage one in the other in the axial direction with respect to the selector shaft and are mounted in a sprung fashion with respect to one another in the circumferential direction by means of rubber elements. A first clutch half is coupled to the selector shaft in a rotationally fixed fashion and is entrained by the second clutch half, and therefore by means of the damping elements, during pivoting of the second clutch half, in order to apply a pivoting movement to the selector shaft. Radial damping is not provided or is only provided to a small degree. A shifting weight is attached to the second clutch half and is therefore damped in the circumferential direction.

SUMMARY OF THE INVENTION

The invention provides a damping device for a selector shaft, which damping device permits an improved damping behavior for a selector shaft. The invention also provides a corresponding gearshift tower.

Within the scope of the invention, a damping device for a selector shaft is proposed, wherein the selector shaft is preferably suitable and/or designed for transmitting shifting movements and/or selection movements in a vehicle, in particular in a passenger motor vehicle or a truck. The damping device serves to dampen desired oscillations or vibrations, in particular oscillations or vibrations which are caused by a shifting movement of the selector shaft.

The damping device has as components a damper weight which is moved during the shifting movement, and a damper unit which is designed to damp the undesired vibrations or oscillations, referred to below throughout as oscillations. In addition, the damping device comprises a guide device which serves to guide the damper weight in a circumferential direction about the selector shaft, wherein the damper weight is guided in such a way that it is damped in the circumferential direction by means of the damper unit. The damper unit acts as a mechanical lowpass filter for oscillations which occur in the circumferential direction. The circumferential direction may be a concentric and/or coaxial movement path with respect to the pivoting axis. In modified embodiments, the circumferential direction means only that the damper weight is guided in any desired curve about the selector shaft. For example, it is possible that in the case of a circular path as the movement path the center point of the circular path is also arranged offset with respect to the pivoting axis of the selector shaft.

The damping device is embodied in such a way that the damper weight is guided or held rigidly and without damping in the radial direction. As a result, the damping device implements an oscillation-damped shifting weight which is restricted in terms of the degrees of freedom of damping. Oscillation damping in the radial direction is considered to be unnecessary, and instead the rigid and/or undamped coupling between the guide device and the shifting weight in the radial direction with respect to the pivoting axis advantageously prohibits or prevents the occurrence of oscillations in this direction.

Within the scope of the invention it is proposed that the damper unit be arranged in its entirety asymmetrically and/or eccentrically and/or off center with respect to the pivoting axis. Considering the invention functionally, it is alternatively or additionally proposed that the damper weight and the damper unit form a damping absorber device which is arranged outside the force transmission path for the shifting and/or selection movement of the selector shaft.

The invention is based on the idea of permitting simple and cost-effective connection with a damped shifting weight to the selector shaft, wherein at the same time the degree of freedom of oscillation of the shifting weight is to be restricted. The arrangement of the damper unit asymmetrically and/or eccentrically, in particular off center, with respect to the pivoting axis of the selector shaft significantly simplifies integration and mounting. It is therefore, for example, no longer necessary to act on the selector shaft in the event of error of the damper unit but rather it is sufficient to exchange the damper unit which is arranged off center, in particular at a distance, with spacing and/or in a radially offset fashion, with respect to the selector shaft. The functional assembly of the damped shifting weight is consequently decoupled with respect to the functional group of the selector shaft. The damper weight and the damper unit are arranged as a damping absorber device outside the force transmission path for the shifting movements and/or selector movements, with the result that the latter do not form a serial part of the force transmission path but rather in particular are arranged as blind and elements with respect to the force transmission path. This possible embodiment to be mentioned has the advantage that the damping absorber device is not installed serially in the force transmission path and when it is replaced the force transmission path does not necessarily have to be opened.

The damper device acts particularly advantageously in the acceleration and braking phase within the scope of the shifting and/or selection process. The damper device is often accelerated and braked at the end of the movement path in an abrupt fashion, for example by a hard stop, with the result that oscillations are generated in the selector shaft or in the damper device. During this changing speed or during a further abrupt change in speed, the damper weight can continue to oscillate and continue the oscillation energy in the damper unit through internal friction about the oscillations being passed on, for example via a Bowden cable or lever, into the passenger compartment.

In one preferred embodiment of the invention, the damping device has a damper arm, wherein the damper weight is arranged on the damper arm with serial intermediate connection of the damper unit. The damper arm is arranged in such a way that it projects out, in particular, in the radial direction, with respect to the selector shaft, wherein the damper unit is positioned on the damper arm spaced apart from the selector shaft.

It is preferably provided that the damper arm is coupled to the selector shaft in a rotationally fixed fashion. The damper arm is optionally coupled directly to the selector shaft, for example by means of a positively locking connection such as, for example, by means of a Torx, dihedral, star shaped connection, etc., and in an alternative embodiment further intermediate elements can be provided.

In one development of the invention, the damping device comprises a guide arm, wherein the damper weight is coupled to the guide arm with no tolerances and/or without damping and/or rigidly in the radial direction with respect to the pivoting axis. As a result of the guide arm, the degree of freedom of damping of the damping device is therefore restricted in the radial direction.

In a first possible alternative there is provision that the guide arm is arranged in a freely rotating fashion on the selector shaft. For example, the guide arm has a circular through-opening which is mounted in a freely rotating fashion on the selector shaft. This coupling ensures that the guide arm limits the damping only in the radial direction but not in the circumferential direction. In one alternative embodiment there may be provision that the guide arm is coupled in an articulated fashion to the damper arm. This alternative embodiment permits simplified mounting of the damping device on the selector shaft, since all that is than necessary is to provide the mechanical interface for the damper arm. In precise terms, the damper weight is therefore guided in a smaller radius than in the other alternative, with the result that in the case of relatively large pivoting angles between the damper arm and the guide arm a force would be applied to the damper weight in the radial direction or counter to the radial direction. However, since the possible pivoting angle between the damper arm and guide arm is only very small, this effect can be ignored, with the result that the second alternative also causes the damper weight to be freely movable in the circumferential direction and to be rigidly guided in the radial direction at the working point in a technically sufficient approximation.

In one possible embodiment of the invention, the guide arm and the damping weight are embodied in one piece. In this embodiment, it is also possible for this combination to be implemented as a cast component which can be manufactured cost-effectively.

In another embodiment of the invention, the damper arm and/or the guide arm are implemented as a sheet metal structure, the latter being manufactured from a sheet metal semi-finish product, for example by cutting and, if appropriate, shaping. In this embodiment, the guide device can be manufactured very favorably, in particular in large numbers. Corresponding structural rigidity of the two arms can be implemented, for example, by means of bending regions, in particular chamfers, optionally with bending lines parallel or perpendicular with respect to the radial direction of the pivoting axis.

In particular there is provision that the damper arm and guide arm are arranged with respect to one another in a movable manner, that is to say can be pivoted with respect to one another in particular about the point of articulated connection of the guide arm to the selector shaft or to the damper arm, wherein the movement thereof with respect to one another in the pivoting direction is damped by means of the damper unit.

In one possible structural refinement of the invention, the guide device has a coupling section to an interface for the purpose of coupling, for example a shifting cable or a shifting linkage. For example, the section can comprise a ball head as a mechanical interface. As a result of the incorporation of the coupling section, a further function is assigned to the damping device, wherein a multifunctional assembly is provided by means of the integration.

The coupling section is preferably arranged on the damper arm, with the result that shifting and/or selection movements which are applied via the guide device are applied to the selector shaft rigidly or without a serial damping element within the force transmission path. The interface is arranged on the damper arm, wherein the damper weight forms, with the damping unit, the damping absorber device which is not intermediately serially connected in the force transmission path between the interface and the selector shaft.

In one possible structural refinement of the invention, the damper unit has a straight hollow cylindrical shape which is arranged off center with respect to the selector shaft. The damper weight particularly preferably has a barbell shape, wherein the barbell type handle is surrounded by the damper unit with the hollow cylindrical shape. In one possible refinement, the damper arm comprises a hollow cylindrical section which engages around the damper weight and the damper unit, with the result that the damper arm holds the damper weight with intermediate connection of the damper unit.

A further subject matter of the invention relates to a gearshift tower with a selector shaft for transmitting shifting and/or selection movements, which selector shaft is arranged pivotably and/or movably, and having a damping device for damping the selector shaft during the shifting and/or selection movements, wherein the damping device is embodied, as described above or according to one of the preceding claims.

In one development of the invention, the selector shaft comprises a positively locking section for connecting the damper arm of the damping device in a positively locking fashion. The damping device, in particular the damper arm, can be secured to the selector shaft using, for example, a nut which is screwed onto the selector shaft in the axial direction.

Further features, advantages and effects of the invention emerge from the following description of preferred exemplary embodiments of the invention as well as the appended figures.

DETAILED DESCRIPTION OF THE INVENTION

Figure 1:
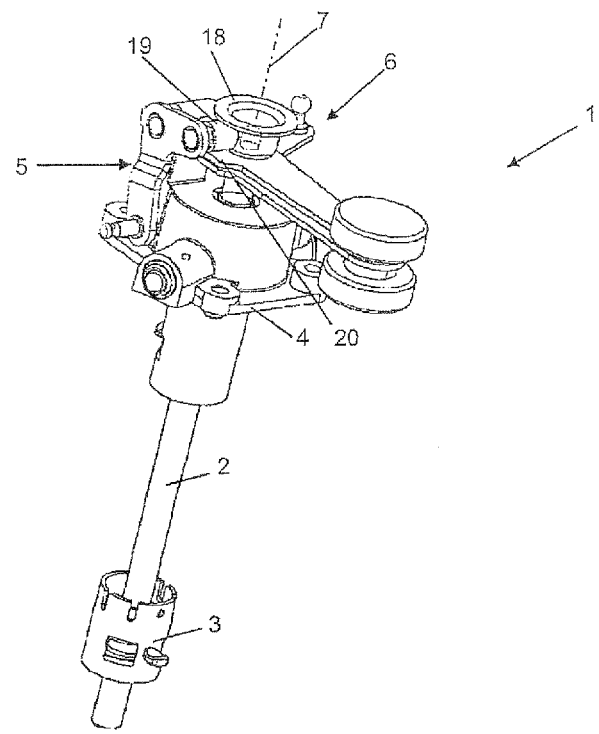
FIG. 1 is a schematic, three-dimensional illustration of a gearshift tower in a lateral plan view.

FIG. 1 shows a schematic, three-dimensional lateral plan view of a gearshift tower 1 for a vehicle transmission, in particular a change speed gearbox. A selector shaft 2, which has, for example, gearshift fingers 3 and other shifting transmission elements, is arranged in the gearshift tower 1.

The selector shaft 2 is guided in such a way that it penetrates a gearshift tower housing 4 which can be screwed onto a gearshift housing (not illustrated). A first lever device 5 for transmitting selection movements and a second lever device 6 for transmitting shifting movements are arranged at the free end of the selector shaft 2. During the selection movements, the selector shaft 2 is moved along its pivoting axis 7, and during shifting movements the selector shaft 2 is pivoted about its pivoting axis 7.

Figure 2:
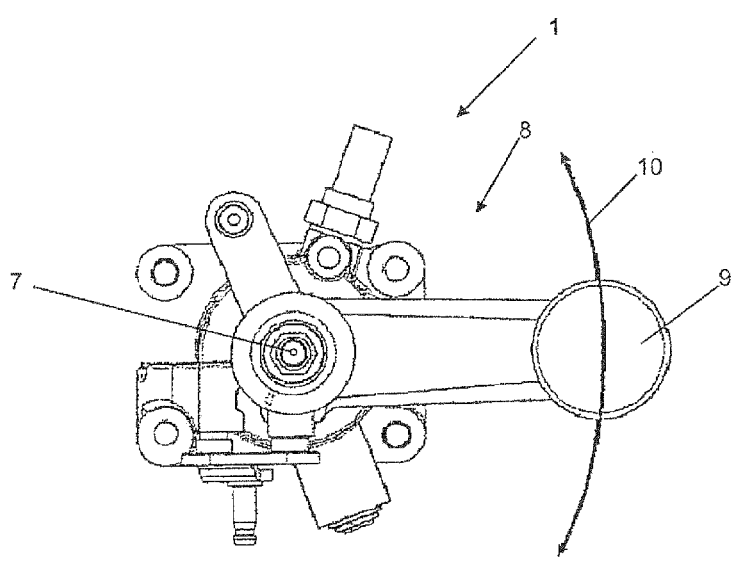
FIG. 2 shows a schematic plan view of the gearshift tower in FIG. 1 in the axial direction.

This pivoting movement is illustrated in FIG. 2 by an arrow in the circumferential direction 10 about the pivoting axis 7, which shows a schematic plan view in the axial direction of the gearshift tower 1 in FIG. 1. In order to compensate undesired oscillations, the gearshift tower 1 has a damping device 8 which extends as an extension arm in the radial direction with respect to the selector shaft 2 and which exhibits a damper weight 9 as its free end. The damper weight 9 is guided about the pivoting axis 2 in the circumferential direction 10 during the pivoting of the selector shaft 2 about the pivoting axis 7. The damping device 8 serves to damp undesired vibrations during the shifting movement, that is to say during the pivoting of the damper weight 9 about the pivoting axis 7.

Figure 3:
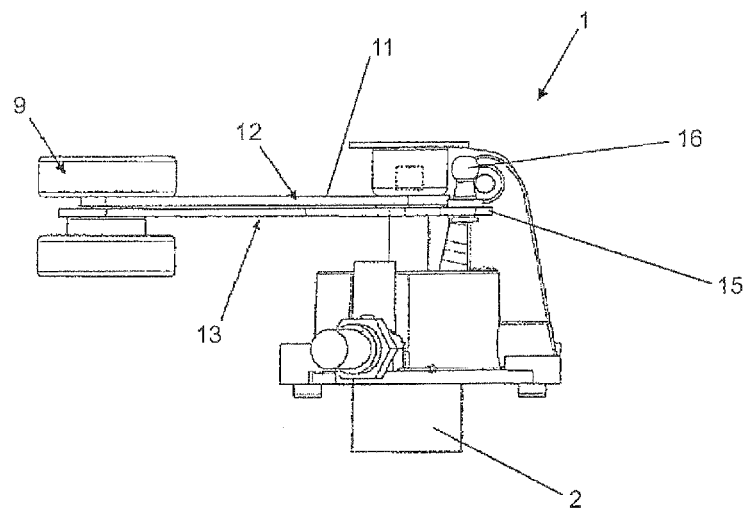
FIG. 3 shows a schematic side view of the gearshift tower in FIG. 1.
Figure 4:
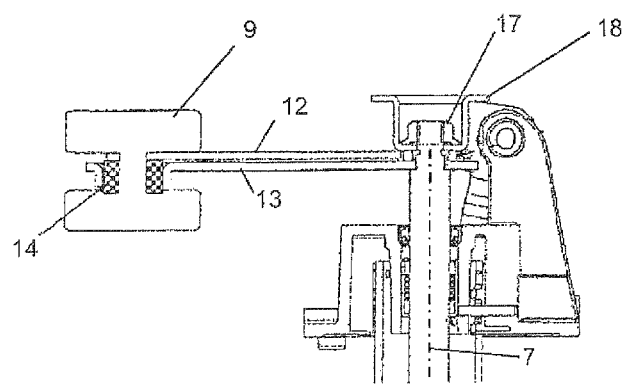
FIG. 4 shows a longitudinal section through the pivoting axis of the selector shaft of the gearshift tower in FIG. 1 in an illustration similar to that in FIG. 3.

For the precise design of the damping device 8, reference is made to FIGS. 3 and 4 which respectively show a lateral plan view and a longitudinal section through the pivoting axis 7 of the gearshift tower 1. The damping device 8 has a guide device 11 which ends at one of its ends at the selector shaft 2 and by its other end at the damper weight 9. Considered more precisely, the guide device 11 is formed from two arms which are arranged in parallel, specifically a guide arm 12 and a damper arm 13.

The damper arm 13 is secured to the selector shaft 2 so as to be rotationally fixed in the circumferential direction 10 by means of a positively locking connection such as, for example, a Torx or a dihedral connection. At its free end, the damper arm 13 is embodied in a hollow cylindrical fashion and it holds in its interior a damper unit 14 which is also in the shape of a hollow cylinder and is made, for example, from plastic, rubber or elastomer, as well as the damper weight 9. In particular, the damper weight 9 is held in the damper arm 13 by means of the damper unit 14, with the result that the damper unit 14 forms a mechanical lowpass filter between the damper arm 13 and the damper weight 9. Since the damper unit 14 is of rotationally symmetrical design in this exemplary embodiment of the invention, oscillations are damped in all directions.

However, it is assumed that damping is not necessary in the radial direction with respect to the pivoting axis 2 but instead it has a counter-productive effect since this supplies additional and undesired oscillations to the overall system. In order to limit or prevent the damping in the radial direction, the guide arm 12 is provided. The latter is mounted in a freely rotating fashion on the selector shaft 2, with the result that said guide arm 12 can rotate freely about the pivoting axis 7 on the selector shaft 2. At the other end, the guide arm 12 holds the damper weight 9 rigidly and/or without tolerances in the radial direction. By means of the guide arm 12, the damper weight 9 is therefore coupled to the selector shaft 2 rigidly and/or without damping in the radial direction. The damping device 8 therefore ensures that oscillations in the circumferential direction 10 are damped by means of the damper unit 14 and oscillations in the radial direction with respect to the selector shaft 12 are absorbed rigidly, in particular oscillations, which occur due to braking of the damping device 8 against a hard stop during the pivoting movement in the circumferential direction 10, are effectively damped.

As is apparent in particular from FIG. 3, the second lever device 6 has a coupling section 15 with a ball head 16 which is designed to apply the shifting forces and which is preferably arranged in one piece on the damper arm 13, with the result that shifting movements are transmitted without damping from the lever device 6 to the selector shaft 2. The arrangement comprising the damper weight 9, the damper unit 14 and the guide device 11 therefore forms a mass damper or a damper absorber which is positioned outside the force transmission flow of the shifting movement.

The mounting of the damping device 8 can easily be performed by fitting it onto the selector shaft 2, in particular onto the positively locking section of the selector shaft 2, and screwing and therefore securing it in the axial direction by means of a nut 17.

If appropriate, a pot element 18, which forms a guide face for applying selection movements, is secured by means of the nut 16. In this embodiment, a roller 19 (FIG. 1) of the first lever device 5 is arranged between a collar of the pot element 18 and a selection section 20 on the guide device 11, in particular on the guide arm 12, said roller 19 rolling between the guide face and the selection section 20 for the purpose of transmitting the selection forces. In the same embodiment, the damping device 8 is assigned a further function, specifically that of transmitting selection forces.

The invention claimed is:

1. A damping device for a selector shaft, comprising:
a damper weight; a damper unit; and a guide device,
wherein the guide device is arranged to guide the damper weight in a circumferential direction about a pivoting axis of the selector shaft, wherein the damper weight is guided in the circumferential direction so as to be damped by the damper unit,
wherein the guide device is also arranged to hold the damper weight without damping in a radial direction with respect to the pivoting axis,
wherein one of:
the damper unit is arranged one of off-center, asymmetrically and eccentrically with respect to the pivoting axis, and
the damper weight and the damper unit form a damping absorber device arranged outside of a force transmission path of a shifting movement or a selection movement of the selector shaft.

2. The damping device according to claim 1, and further comprising a damper arm, wherein the damper weight is arranged on the damper arm with the damper unit connected between the damper weight and the damper arm.

3. The damping device according to claim 2, wherein the damper arm is coupled to the selector shaft so that the damper arm is fixed with respect to rotation relative to the selector shaft.

4. The damping device according to claim 2, and further comprising a guide arm, wherein the damper weight is coupled to the guide arm without damping or rigidly.

5. The damping device according to claim 4, wherein the guide arm is mounted so as to be freely rotatable on the selector shaft.

6. The damping device according to claim 4, wherein the guide arm and the damper weight are each a one piece cast component.

7. The damping device according to claim 4, wherein at least one of the damper arm and the guide arm a sheet metal structure.

8. The damping device according to claim 2, wherein the guide device comprises a coupling section that has an interface for initiating the shifting and selection movements.

9. The damping device according to claim 8, wherein the coupling section is arranged on the damper arm.

10. The damping device according to claim 1, wherein the damper unit has a hollow cylindrical shape.

11. The damping device according to claim 1, wherein the damper weight has a barbell shape or a barbell handle.

12. The damping device according to claim 11, wherein the damper arm has a hollow cylinder section that engages around the damper weight and the damper unit.

13. A gearshift tower, comprising:
a selector shaft for transmitting shifting movements or selection movements, the selector shaft being at least one of pivotal and displaceable; and
a damping device for damping of oscillations or vibrations of the selector shaft during the shifting movements or the selection movements, the damping device including a damper weight; a damper unit; and a guide device, wherein the guide device is arranged to guide the damper weight in a circumferential direction about a pivoting axis of the selector shaft, wherein the damper weight is guided in the circumferential direction so as to be damped by the damper unit, wherein the guide device is also arranged to hold the damper weight without damping in a radial direction with respect to the pivoting axis, wherein one of:
the damper unit is arranged one of off-center, asymmetrically and eccentrically with respect to the pivoting axis, and
the damper weight and the damper unit form a damping absorber device arranged outside of a force transmission path of a shifting movement or a selection movement of the selector shaft, and
the damping device further comprising a damper arm, wherein the damper weight is arranged on the damper arm with the damper unit connected between the damper weight and the damper arm, and a guide arm, wherein the damper weight is coupled to the guide arm with without damping or rigidly.

14. The gearshift tower according to claim 13, wherein the selector shaft has a a mechanical interface for receiving the guide arm in a freely rotatable fashion.

15. The gearshift tower according to claim 14, wherein the selector shaft has a positively locking section for connecting the damper arm in a non-pivoting fashion.

16. The gearshift tower according to claim 13, wherein the selector shaft has a positively locking section for connecting the damper arm in a non-pivoting fashion.

\* \* \* \* \*